Patented Jan. 25, 1949

2,459,783

UNITED STATES PATENT OFFICE 2,459,783

FLUORINATION OF UNSATURATED CYCLIC PERCHLORO COMPOUNDS

Earl T. McBee, La Fayette, and Park A. Wiseman, West Lafayette, Ind., assignors to Purdue Research Foundation, West Lafayette, Ind., a corporation of Indiana No Drawing. Application November 30, 1945, Serial No. 632,104

15 Claims. (Cl. 260—648)

This invention relates to a process for the preparation of dichlorofluorocycloalkenes, wherein the chlorine atoms are on adjacent carbons and the double bond is between such adjacent carbon atoms.

It is among the objects of this invention to provide a method of producing 1,2-dichlorofluorocycloalkenes which are new and useful compounds, utilizable in the synthesis of intermediates for the preparation of fluorinated resins. It is a further object to provide a method of producing such compounds in quantity, with good yields upon separation of the 1,2-dichlorofluorocycloalkene from the reaction product.

A still further object of this invention is to provide a method for the fluorination of unsaturated cyclic chlorocarbons, wherein the fluorination may be caused to occur on all nuclear carbon atoms with the exception of two carbon atoms, between which carbon atoms remains a single double bond, and on each of which two olefinic carbon atoms remains a substituted chlorine atom. Further objects of the invention will be apparent from the following specification and claims.

We have accomplished the objects of this invention, and have prepared representative members of the series of 1,2-dichlorofluorocycloalkenes. We are aware that previous workers have utilized pentavalent antimony halides as catalysts in fluorination reactions, and that metallic perfluorides, as well as metallic fluorides and bromine trifluoride have been used to attain greater or lesser degrees of fluorination in organic halocompounds. In no case, however, insofar as we are aware, has any investigator reported such fluorination reactions to retain chlorine atoms in position on an unsaturated cyclic nucleus as desired.

We have now found that an unsaturated cyclic chloro compound, for example, perchlorocyclobutene, perchlorocyclobutadiene, perchlorocyclopentene, perchlorocyclopentadiene, perchlorocyclohexene, perchlorocyclohexadiene, perchlorobenzene, perchlorobiphenyl, perchloronaphthalene, pentachlorobenzotrifluoride, pentachloro (pentafluoroethyl) benzene, tetrachlorobis (trifluoromethyl) benzene, and any other unsaturated cyclic chlorocarbon containing at least one double bond, may be treated with a fluorinating agent, i. e., antimony pentafluoride, in a fluorination process to replace all of the chlorine in the unsaturated cyclic chloro compound other than two chlorine atoms remaining attached to the olefinic carbons of a double bond, and to saturate, with fluorine, all other double bonds of the cyclic nucleus.

Apparatus which may be employed in the process comprises either a glass flask or a nickel autoclave. Satisfactory results have been obtained in either of these vessels and the type of vessel employed is not to be regarded as limiting the invention.

We shall now describe the process as carried out in each of the vessels as enumerated above. The unsaturated cyclic chloro compound, containing at least one double bond, and antimony pentafluoride were added to a two-liter, three-neck flask provided with a mercury-seal stirrer and reflux condenser. Upon mixing these reactants, the reaction flask became warm. The contents of the reaction flask were warmed gently for two hours. During this time the reflux condenser was vented through a Dry-Ice cooled condenser. The condenser was then rearranged so that distillation could proceed. With vigorous stirring, the temperature of the mixture was raised slowly, usually to about 200 degrees centigrade, at which temperature no more material distilled. The product was poured into water, steam-distilled, and washed thoroughly with acid solution to remove dissolved antimony salts. This material was dried over a calcium chloride-calcium sulphate mixture and rectified in a four-foot, helix-packed column. Various fractions were isolated, among which the pure 1,2-dichlorofluorocycloalkene was found in yields up to 45 per cent.

The alternate apparatus was a two-gallon, nickel autoclave provided with a stirrer and a three-foot length of one-inch nickel pipe as a condenser. This condenser was vented through air-cooled and Dry-Ice cooled condensers in series. The reactants were charged to the autoclave and heated, with stirring, to 200 degrees centigrade over a four hour period. The temperature was maintained between 200 and 220 degrees centigrade for an additional two-hour period to permit low-boiling product to distill from the reactor. The product from the two traps was combined and treated as previously described. The steam-distilled product was washed with sodium bicarbonate solution and water, and dried over a dehydrating agent. Rectification of the dried product gave substantial yields of the 1,2-dichlorofluorocycloalkene up to 31.6 per cent of the theoretical.

While the above conditions of temperature are the optimum for conducting our process, it is to be understood that other temperatures between about room temperature and 250 degrees centigrade may be employed.

The following examples are descriptive of a number of ways in which the principle of the invention may be applied, but are in no way to be construed as limiting the scope of the invention thereto.

Example 1

The preparation of a 1,2-dichlorooctafluorocyclohexene was accomplished in the following manner. Three hundred grams of hexachlorobenzene and 1000 grams of antimony pentafluoride were added to a two-liter, three-neck flask provided with a mercury-seal stirrer, thermometer and reflux condenser. As a means of preventing loss of low-boiling product, the reflux condenser was vented through an air-cooled receiver and a Dry-Ice cooling trap. At room temperature a dark-blue complex was formed by the antimony pentafluoride and hexachlorobenzene, but no further reaction was evident. This product was heated at approximately 100 degrees for two hours. At this time the reflux condenser was arranged to allow distillation from the flask. The temperature of the reactants was then raised slowly to 200 degrees centigrade and maintained at this level until distillation was complete. The product from the cold trap and the distillation receiver was steam-distilled, 274 grams of colorless liquid being separated from the distillate. This crude product was washed thoroughly with hydrochloric acid solution and water to remove any antimony salts. The washed product was dried over calcium chloride and rectified in a four-foot, helix-packed column; 260 grams of dried product being charged to the column. One hundred twenty-six and one-half grams of pure 1,2-dichlorooctafluorocyclohexene was recovered, boiling between 111.0 and 113.0 degrees centigrade at 749 millimeters of mercury pressure absolute. This fraction, based on the amount of hexachlorobenzene charged to the flask, represents a yield of 42.2 per cent of the 1,2-dichlorooctafluorocyclohexene by this process, not considering the additional amount of this product obtainable by recycling the fraction boiling above 113 degrees centigrade.

Example 2

In this case the preparation of 1,2-dichlorooctafluorocyclohexene was carried out in an autoclave according to a similar procedure. Twelve hundred grams of hexachlorobenzene and 4427 grams of antimony pentafluoride were charged into a two-gallon, nickel autoclave provided with a stirrer and a three-foot length of one-inch pipe, which acted as a condenser. This condenser was vented through an air-cooled and Dry-Ice cooled condenser in series. The autoclave and its stirred contents were heated over a four-hour period to 200 degrees centigrade, and maintained between 200 and 220 degrees centigrade for an additional two hours to permit low-boiling products to distill therefrom. The product from the two traps was accumulated, washed thoroughly with concentrated hydrochloric acid solution and steam-distilled. Eleven hundred and seventeen grams of water-insoluble product was collected from the distillate. This product was washed well with sodium bicarbonate solution and water and dried over calcium chloride. The dry product, weighing 1068 grams, was rectified in a three-foot, helix-packed column, yielding 392 grams of 1,2-dichlorooctafluorocyclohexene, boiling between 111.0 and 113.0 degrees centigrade at 746 millimeters of mercury pressure absolute. The yield of 1,2-dichlorooctafluorocyclohexene in this instance was 31.6 per cent, based on the amount of hexachlorobenzene in the raction.

Example 3

1,2-Dichlorohexafluorocyclopentene was prepared in the manner outlined below. One mole (273 grams) of hexachlorocyclopentadiene and 500 grams (2.3 moles) of antimony pentafluoride were added to a two-liter, three-neck flask provided with a dropping funnel, a mercury-seal stirrer, and a reflux condenser. On mixing the reactants a dark-blue complex formed, and the reaction flask became warm. With the reflux condenser vented in series with a Dry-Ice cooled condenser, the contents of the flask were warmed gently for two hours, at the end of which time the condenser was changed so distillation could begin. Stirring vigorously, the temperature of the mixture was raised slowly to about 200 degrees centigrade where no further distillation occurred. A colorless, water-insoluble liquid separated when the distillate was poured into water. This product was steam-distilled, washed thoroughly with hydrochloric acid solution and water to remove dissolved antimony salts, and dried over a calcium chloride-calcium sulphate mixture. The dried product, about 200 grams, was then rectified in a four-foot, helix-packed column. The 1,2-dichlorohexafluorocyclopentene boiled at 88 to 89 degrees centigrade at 743 millimeters of mercury pressure absolute, and represented over a 40 per cent yield, based on the hexachlorocyclopentadiene charged into the reactor.

An advantage of the process, carried out in either glass or autoclave, is the yield of desired product in very satisfactory amounts. Another advantage to be noted is the moderate temperature employed in this fluorination process, which, being very low in comparison to temperatures used in many fluorination processes, substantially avoids carbonization and pyrolysis.

We claim:

1. In a process for the preparation of a 1,2-dichlorofluorocycloalkene halocarbon, wherein the two chlorine atoms are attached to the two olefinic carbon atoms of the single double bond, the step which includes: treating an unsaturated cyclic chlorocarbon with antimony pentafluoride at a fluorinating temperature between about room temperature and about 250 degrees centigrade for a period of time sufficient to produce a 1,2-dichlorofluorocycloalkene halocarbon.

2. A process for the fluorination of an unsaturated cyclic chlorocarbon which includes: treating an unsaturated cyclic chlorocarbon with antimony pentafluoride at a fluorinating temperature between about room temperature and about 250 degrees centigrade for a period of time sufficient to cause fluorination of the cyclic chlorocarbon, and separating from the reaction product a fluorine-containing alicyclic halocarbon containing the same number of carbon atoms as the starting unsaturated cyclic chlorocarbon.

3. In a process for the preparation of a 1,2-dichlorofluorocycloalkene halocarbon, the steps which include: treating an unsaturated cyclic chlorocarbon with antimony pentafluoride at a fluorinating temperature between about room temperature and about 250 degrees centigrade for a period of time sufficient to cause fluorination of the chlorocarbon, and separating from the reaction product a 1,2-dichlorofluorocycloalkene halocarbon.

4. A process for the preparation of a chlorofluorocycloalkene halocarbon which includes: heating an unsaturated cyclic chlorocarbon with antimony pentafluoride at a temperature between about room temperature and about 250 degrees centigrade for a period of time sufficient to cause fluorination of the chlorocarbon, and separating from the reaction product a chlorofluorocycloalkene.

5. A process for the addition of fluorine to a double bond of an unsaturated cyclic chlorocarbon which includes: treating an unsaturated cyclic chlorocarbon with antimony pentafluoride at a temperature between about room temperature and about 250 degrees centigrade for a period of time sufficient to cause the addition of fluorine to at least one double bond of the cyclic chlorocarbon, and separating from the reaction product a fluorine-containing alicyclic halocarbon which contains the same number of carbon atoms as the starting unsaturated cyclic chlorocarbon.

6. The process as claimed in claim 2, wherein the unsaturated cyclic chlorocarbon treated is an alicyclic chlorocarbon.

7. The process as claimed in claim 2, wherein the unsaturated cyclic chlorocarbon treated is an aromatic chlorocarbon.

8. The process as claimed in claim 2, wherein the temperature is maintained below about 200 degrees centigrade.

9. The process which includes: heating an unsaturated cyclic halocarbon, containing chlorine atoms as the only nuclear halogen atom substituents, and having a chlorine atom on each of adjacent olefinic carbon atoms of the same double bond, with antimony pentafluoride at a temperature between about room temperature and about 250 degrees centigrade to convert it to a 1,2-dichlorofluorocycloalkene halocarbon.

10. The process which includes: heating an unsaturated cyclic halocarbon, containing chlorine atoms as the only nuclear halogen atom substituents, and having a chlorine atom on each of adjacent olefinic carbon atoms of the same double bond, with antimony pentafluoride at a temperature between about room temperature and about 250 degrees centigrade to convert it to a more highly saturated fluorine-containing alicyclic halocarbon containing the same number of carbon atoms as the starting unsaturated cyclic halocarbon.

11. The process as claimed in claim 5, wherein the temperature is maintained below about 200 degrees centigrade.

12. The process of claim 5, wherein the reactants are contacted at about room temperature and thereafter heated at a temperature between about room temperature and about 200 degrees centigrade.

13. The process as claimed in claim 3, wherein a fraction of the reaction product boiling above the temperature of the 1,2-dichlorofluorocycloalkene is recycled in the process.

14. The process as claimed in claim 3 wherein the unsaturated cyclic chlorocarbon is hexachlorobenzene and the compound separated from the reaction product is 1,2-dichlorooctafluorocyclohexene.

15. The process as claimed in claim 3 wherein the unsaturated cyclic chlorocarbon is hexachlorocyclopentadiene and the compound separated from the reaction product is 1,2-dichlorohexafluorocyclopentene.

EARL T. McBEE.
PARK A. WISEMAN.

REFERENCES CITED

The following references are of record in the file of this patent:

UNITED STATES PATENTS

| Number | Name | Date |
|---|---|---|
| 2,005,710 | Daudt et al. | June 18, 1935 |
| 2,013,035 | Daudt et al. | Sept. 3, 1935 |
| 2,394,581 | Benning et al. | Feb. 12, 1946 |

FOREIGN PATENTS

| Number | Country | Date |
|---|---|---|
| 429,591 | Great Britain | May 28, 1935 |

OTHER REFERENCES

Bigelow et al., "J. A. C. S.," vol. 56, pages 2773-4 (1934).

Fukuhara et al., "J. A. C. S.," vol. 60, pages 427-9 (1938).

Ruff, "Ber. deutsch. Chem. Ges.," vol. 39, pages 4310-4318 (1906).

Henne and Zimmerschied, "J. Am. Chem. Soc.," vol. 67, pages 1235-1237 (Aug. 9, 1945).